US012731539B2

(12) United States Patent
Yang et al.

(10) Patent No.: US 12,731,539 B2
(45) Date of Patent: Sep. 8, 2026

(54) PIXEL DRIVING CIRCUIT AND METHOD OF DRIVING THE SAME, AND DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Chengchung Yang, Beijing (CN); Yucheng Chan, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/291,441

(22) PCT Filed: Apr. 25, 2023

(86) PCT No.: PCT/CN2023/090670
§ 371 (c)(1),
(2) Date: Jan. 23, 2024

(87) PCT Pub. No.: WO2023/213214
PCT Pub. Date: Nov. 9, 2023

(65) Prior Publication Data

US 2025/0104624 A1 Mar. 27, 2025

(30) Foreign Application Priority Data

May 6, 2022 (CN) ......................... 202210489836.7

(51) Int. Cl.
*G09G 3/3233* (2016.01)

(52) U.S. Cl.
CPC ... *G09G 3/3233* (2013.01); *G09G 2300/0852* (2013.01); *G09G 2300/0861* (2013.01);
(Continued)

(58) Field of Classification Search
CPC ......... G09G 3/3233; G09G 2300/0852; G09G 2300/0861; G09G 2310/08; G09G 2320/0233; G09G 2320/0257
See application file for complete search history.

(56) References Cited

U.S. PATENT DOCUMENTS 10,496,224 B2 * 12/2019 Luo ..................... G06F 3/04186
10,650,751 B2 * 5/2020 Zou .................... H10K 59/1216
(Continued)

FOREIGN PATENT DOCUMENTS

CN 105810693 A 7/2016
CN 104575394 B 2/2017
(Continued)

OTHER PUBLICATIONS

Decision of Rejection for Chinese Patent Application No. 202210489836.7 issued by the Chinese Patent Office on Aug. 16, 2023.
(Continued)

*Primary Examiner* — Ariel A Balaoing
(74) *Attorney, Agent, or Firm* — XSENSUS LLP

(57) ABSTRACT

A pixel driving circuit includes: a dual-gate driving transistor, a compensation sub-circuit, a data writing sub-circuit and a light-emitting control sub-circuit. A first electrode of the dual-gate driving transistor is coupled to a first voltage terminal. The compensation sub-circuit is configured to write a compensation signal of a compensation signal terminal into a first gate of the dual-gate driving transistor in response to a signal of a first control signal terminal. The data writing sub-circuit is configured to write a data signal
(Continued)

of a data signal terminal into a second gate of the dual-gate driving transistor in response to a signal of a second control signal terminal. The light-emitting control sub-circuit is configured to cause a second electrode of the dual-gate driving transistor and a first electrode of a light-emitting element to be connected or disconnected in response to a signal of a light-emitting control signal terminal.

16 Claims, 7 Drawing Sheets

(52) U.S. Cl.
CPC . *G09G 2310/08* (2013.01); *G09G 2320/0233* (2013.01); *G09G 2320/0257* (2013.01)

(56) References Cited

U.S. PATENT DOCUMENTS

| | | | | |
|---|---|---|---|---|
| 11,810,504 | B2 * | 11/2023 | Cheng | H10K 59/121 |
| 2011/0122325 | A1 * | 5/2011 | Yamashita | G09G 3/3233 348/739 |
| 2015/0171156 | A1 * | 6/2015 | Miyake | H10D 86/481 257/43 |
| 2016/0042694 | A1 | 2/2016 | Lim et al. | |
| 2016/0365030 | A1 | 12/2016 | Wu | |
| 2018/0102397 | A1 * | 4/2018 | Nie | G09G 3/3233 |
| 2018/0268757 | A1 | 9/2018 | Chen et al. | |
| 2019/0057648 | A1 | 2/2019 | Xu | |
| 2019/0096327 | A1 * | 3/2019 | Peng | G09G 3/3241 |
| 2019/0164476 | A1 | 5/2019 | Feng et al. | |
| 2019/0355308 | A1 | 11/2019 | Verschueren et al. | |
| 2019/0362674 | A1 | 11/2019 | Xu | |
| 2020/0135091 | A1 | 4/2020 | Kim | |
| 2021/0049959 | A1 | 2/2021 | Park et al. | |
| 2021/0201790 | A1 * | 7/2021 | Gai | G09G 3/3233 |
| 2022/0101781 | A1 * | 3/2022 | Baumheinrich | G09G 3/32 |
| 2023/0410746 | A1 * | 12/2023 | Wang | G09G 3/3291 |
| 2024/0119892 | A1 * | 4/2024 | Chen | G09G 3/3233 |

FOREIGN PATENT DOCUMENTS

| | | | | |
|---|---|---|---|---|
| CN | 107767814 A | | 3/2018 | |
| CN | 105810145 B | | 6/2018 | |
| CN | 108510942 A | | 9/2018 | |
| CN | 108597448 A | | 9/2018 | |
| CN | 106875893 B | | 3/2019 | |
| CN | 110021265 A | | 7/2019 | |
| CN | 110503919 A | | 11/2019 | |
| CN | 111179850 A | | 5/2020 | |
| CN | 111199705 A | | 5/2020 | |
| CN | 114694589 A | | 7/2022 | |
| EP | 3367374 A1 | | 8/2018 | |
| KR | 10-2019-0103131 A | | 9/2019 | |
| WO | WO-2019023962 A1 | * | 2/2019 | G09G 3/32 |

OTHER PUBLICATIONS

The First Office Action for Chinese Patent Application No. 202210489836.7 issued by the Chinese Patent Office on Nov. 28, 2022.

The Second Office Action for Chinese Patent Application No. 202210489836.7 issued by the Chinese Patent Office on May 19, 2023.

* cited by examiner

PIXEL DRIVING CIRCUIT AND METHOD OF DRIVING THE SAME, AND DISPLAY PANEL

CROSS-REFERENCE TO RELATED APPLICATIONS

This application is a national phase entry under 35 USC 371 of International Patent Application No. PCT/CN2023/090670, filed on Apr. 25, 2023, which claims priority to Chinese Patent Application No. 202210489836.7, filed on May 6, 2022, which are incorporated herein by reference in their entirety.

TECHNICAL FIELD

The present disclosure relates to the field of display technologies, and in particular, to a pixel driving circuit and a method of driving the same, and a display panel.

BACKGROUND

In the field of display technologies, the display panel includes a plurality of sub-pixels, and each sub-pixel includes a pixel driving circuit and a light-emitting element. The pixel driving circuit can drive the corresponding light-emitting element to emit light under the control of driving signal(s) of a gate driver on array (GOA).

In recent years, as users' requirements for display panels have increased, there have been more and more products with high pixels per inch (PPI). Since the display panels of the high PPI products have a large number of sub-pixels per unit area, the display panels can display images at a high density, which results in rich details in the images.

SUMMARY

In an aspect, a pixel driving circuit is provided, which includes a dual-gate driving transistor, a compensation sub-circuit, a data writing sub-circuit and a light-emitting control sub-circuit. The dual-gate driving transistor includes a first gate, a second gate, a first electrode and a second electrode. The first electrode of the dual-gate driving transistor is coupled to a first voltage terminal. The compensation sub-circuit is coupled to a compensation signal terminal and the first gate of the dual-gate driving transistor, and is configured to write a compensation signal of the compensation signal terminal into the first gate of the dual-gate driving transistor in response to a signal of a first control signal terminal. The data writing sub-circuit is coupled to a data signal terminal and the second gate of the dual-gate driving transistor, and is configured to write a data signal of the data signal terminal into the second gate of the dual-gate driving transistor in response to a signal of a second control signal terminal. The light-emitting control sub-circuit is coupled to the second electrode of the dual-gate driving transistor and a first electrode of a light-emitting element, and is configured to cause the second electrode of the dual-gate driving transistor and the first electrode of the light-emitting element to be connected or disconnected in response to a signal of a light-emitting control signal terminal.

In some embodiments, the pixel driving circuit further includes a first storage sub-circuit coupled between the first voltage terminal and the first gate of the dual-gate driving transistor and configured to store the compensation signal.

In some embodiments, the compensation sub-circuit includes a first transistor, the first storage sub-circuit includes a first capacitor; a gate of the first transistor is configured to be coupled to the first control signal terminal, a first electrode of the first transistor is coupled to the first gate of the dual-gate driving transistor and a first terminal of the first capacitor; a second electrode of the first transistor is coupled to the compensation signal terminal; and a second terminal of the first capacitor is coupled to the first voltage terminal.

In some embodiments, the compensation signal is the same as a threshold voltage of the dual-gate driving transistor.

In some embodiments, the pixel driving circuit further includes a second storage sub-circuit coupled to the first voltage terminal and the second gate of the dual-gate driving transistor and configured to store the data signal.

In some embodiments, the data writing sub-circuit includes a second transistor, the second storage sub-circuit includes a second capacitor; the data writing sub-circuit includes a second transistor; the second storage sub-circuit includes a second capacitor; a gate of the second transistor is configured to be coupled to the second control signal terminal, a first electrode of the second transistor is coupled to the data signal terminal, and a second electrode of the second transistor is coupled to a first terminal of the second capacitor and the second gate of the dual-gate driving transistor; and a second terminal of the second capacitor is coupled to the first voltage terminal.

In some embodiments, the light-emitting control sub-circuit includes a third transistor, a gate of the third transistor is configured to be coupled to the light-emitting control signal terminal, a first electrode of the third transistor is coupled to the second electrode of the dual-gate driving transistor, and a second electrode of the third transistor is coupled to the first electrode of the light-emitting element.

In some embodiments, the pixel driving circuit further includes a reset control sub-circuit; the reset control sub-circuit is coupled to the first electrode of the light-emitting element and a second voltage terminal, and is configured to write a signal of the second voltage terminal into the first electrode of the light-emitting element in response to a signal of a third control signal terminal, so as to reset the first electrode of the light-emitting element.

In some embodiments, the reset control sub-circuit includes a fourth transistor, a gate of the fourth transistor is configured to be coupled to the third control signal terminal, a first electrode of the fourth transistor is coupled to the first electrode of the light emitting element, and a second electrode of the fourth transistor is coupled to the second voltage terminal.

In some embodiments, the second transistor is a P-type transistor, and the second control signal terminal and the third control signal terminal are connected to the same signal line.

In some embodiments, the second transistor is an N-type transistor, and the first control signal terminal and the third control signal terminal are connected to the same signal line.

In some embodiments, the pixel driving circuit further includes a first selecting device and a second selecting device. A first terminal of the first selecting device and a first terminal of the second selecting device are coupled to a signal input terminal, a second terminal of the first selecting device is coupled to the compensation signal terminal, a second terminal of the second selecting device is coupled to the data signal terminal, and the first selecting device and the second selecting device are not turned on at the same time.

In another aspect, the embodiments of the present disclosure provide a display panel, which includes a plurality of sub-pixels arranged in an array, and each sub-pixel includes the light-emitting element and the pixel driving circuit as described in any one of the above embodiments.

In some embodiments, first control signal terminals of pixel driving circuits of sub-pixels located in an i-th row and second control signal terminals and third control signal terminals of pixel driving circuits of sub-pixels located in an (i−1)-th row are connected to the same signal line, where i is a positive integer greater than 1 and i is less than or equal to a total number of rows of the plurality of sub-pixels.

In yet another aspect, the embodiments of the present disclosure provide a method of driving a pixel driving circuit, which is used in the pixel driving circuit as described in any one of the above embodiments. A workflow of the pixel driving circuit in a display frame includes a compensation control phase, a data writing phase and a light-emitting phase. The method includes the followings.

First, in the compensation control phase, the data writing sub-circuit and the light-emitting control sub-circuit are controlled to be turned off, and the compensation sub-circuit is controlled to be turned on, so as to write the compensation signal into the first gate of the dual-gate driving transistor.

Then, in the data writing phase, the compensation sub-circuit and the light-emitting control sub-circuit are controlled to be turned off, and the data writing sub-circuit is controlled to be turned on, so as to write the data signal into the second gate of the dual-gate driving transistor.

Next, in the light-emitting phase, the compensation sub-circuit and the data writing sub-circuit are controlled to be turned off, and the light-emitting control sub-circuit is controlled to be turned on, so as to drive the light-emitting element to emit light.

In some embodiments, the compensation signal is the same as a threshold voltage of the dual-gate driving transistor.

In some embodiments, in a case where the pixel driving circuit includes a reset control sub-circuit, the reset control sub-circuit is configured to write a signal of a second voltage terminal into the first electrode of the light-emitting element in response to a signal of a third control signal terminal, so as to reset to the first electrode of the light-emitting element; and in a case where a second transistor is a P-type transistor, the method further includes: controlling the signal of the second control signal terminal to be the same as the signal of the third control signal terminal.

In some embodiments, in a case where the pixel driving circuit includes a reset control sub-circuit, the reset control sub-circuit is configured to write a signal of a second voltage terminal into the first electrode of the light-emitting element in response to a signal of a third control signal terminal, so as to reset to the first electrode of the light-emitting element; and in a case where a second transistor is an N-type transistor, the method further includes: controlling the signal of the first control signal terminal to be the same as the signal of the third control signal terminal.

In some embodiments, the method further includes: first, in the compensation control phase, controlling a first selecting device to be turned on and controlling a second selecting device to be turned off; then, in the data writing phase, controlling the second selecting device to be turned on and controlling the first selecting device to be turned off.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
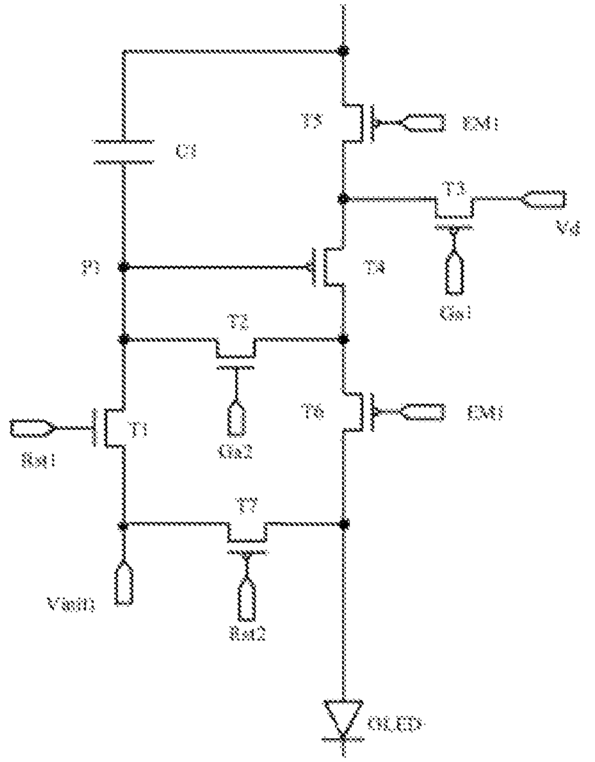
FIG. 1 is a circuit diagram of a pixel driving circuit in the related art.

The technical solutions in some embodiments of the present disclosure will be described clearly and completely with reference to the accompanying drawings. However, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, the term such as "one embodiment", "some embodiments", "exemplary embodiments", "example" or "some examples" is intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, features defined with "first" and "second" may explicitly or implicitly include one or more of the features. In the description of the embodiments of the present disclosure, the terms "a plurality of", "the plurality of" and "multiple" each mean two or more unless otherwise specified.

In the description of some embodiments, the terms "coupled", "connected" and derivatives thereof may be used. For example, the term "connected" may be used when describing some embodiments to indicate that two or more components are in direct physical or electrical contact with each other. For another example, the term "coupled" may be used when describing some embodiments to indicate that two or more components have direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or value beyond those stated.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The term such as "parallel", "perpendicular" or "equal" as used herein includes a stated case and a case similar to the stated case within an acceptable range of deviation determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; The term "equal" includes absolute equality and approximate equality, and an acceptable range of deviation of the approximate equality may be, for example, that a difference between two equals is less than or equal to 5% of either of the two equals.

It will be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in apparatuses, and are not intended to limit the scope of the exemplary embodiments.

Generally, the pixel driving circuit in the display panel is a pixel driving circuit of a 7T1C structure. As shown in FIG. 1, a common pixel driving circuit of a 7T1C structure includes 7 transistors and 1 capacitor. The 7 transistors are respectively transistors T1 to T7. The transistor T4 is a driving transistor for generating a driving current to drive a light-emitting element (for example, an organic light-emitting diode (OLED) shown in FIG. 1) to emit light.

As shown in FIG. 1, GOA driving signals of the common pixel driving circuit of the 7T1C structure include a gate driving signal Rst1 of the transistor T1, a gate driving signal Ga2 of the transistor T2, a gate driving signal Ga1 of the transistor T3, a gate driving signal EM1 of the transistor T5 and the transistor T6, and a gate driving signal Rst2 of the transistor T7. It can be seen that the pixel driving circuit of the 7T1C structure requires a larger number of groups of GOA driving signals.

That is to say, the pixel driving circuit of the 7T1C structure includes a large number of devices, requires a large number of groups of GOA driving signals, and requires a large wiring space. Therefore, it cannot meet the layout requirements of high PPI products and is difficult to be used in high PPI products.

Moreover, in the pixel driving circuit of the 7T1C structure as shown in FIG. 1, a gate of the driving transistor T4 is coupled to the transistor T1, the transistor T2 and the capacitor C1. The transistor T1 is used to write a reset signal vinit1 of a reset signal terminal Vinit1 into a gate of the driving transistor T4. When the transistor T1 is turned on, since the potential of the capacitor C1 is high and the potential of the reset signal vinit1 of the reset signal terminal is low, the potential difference will cause a current from the capacitor C1 to the reset signal terminal Vinit1. In addition, the transistor T1 and the transistor T2 have leakage current due to structural characteristics. That is, there are two leakage paths of the transistor T1 and the transistor T2 at a P1 node. The leakage current of the two leakage paths will cause the current of the light-emitting element to become smaller and cause flicker, which will lead to the problem of uneven brightness (mura) of the display panel.

In order to solve the above problems, some embodiments of the present disclosure provide a pixel driving circuit and a display apparatus. The number of devices in the pixel driving circuit and the number of required groups of GOA driving signals are reduced, the space occupied by the layout is reduced, and the pixel driving circuit and the display apparatus are more suitable for high PPI products. Moreover, since the second gate of the driving transistor is connected to only one transistor, it may be possible to reduce the leakage current and in turn ameliorate the low-frequency flickering.

Some embodiments of the present disclosure provide a display apparatus. The display apparatus 20 can be a tablet computer, a monitor, a mobile phone, a billboard, a digital photo frame or a personal digital assistant (PDA), or any other device with a display function.

For example, the display apparatus 20 is an organic electroluminescent diode (organic light-emitting diode (OLED)) display apparatus, or a quantum dot electroluminescent diode (quantum dot light-emitting diode (QLED)) display apparatus, or an active matrix organic light-emitting diode (AMOLED) display apparatus. The embodiments of the present disclosure do not limit the specific type of the display apparatus 200. The following embodiments will be described in detail by taking an example in which the display apparatus is an OLED display apparatus.

Figure 2:
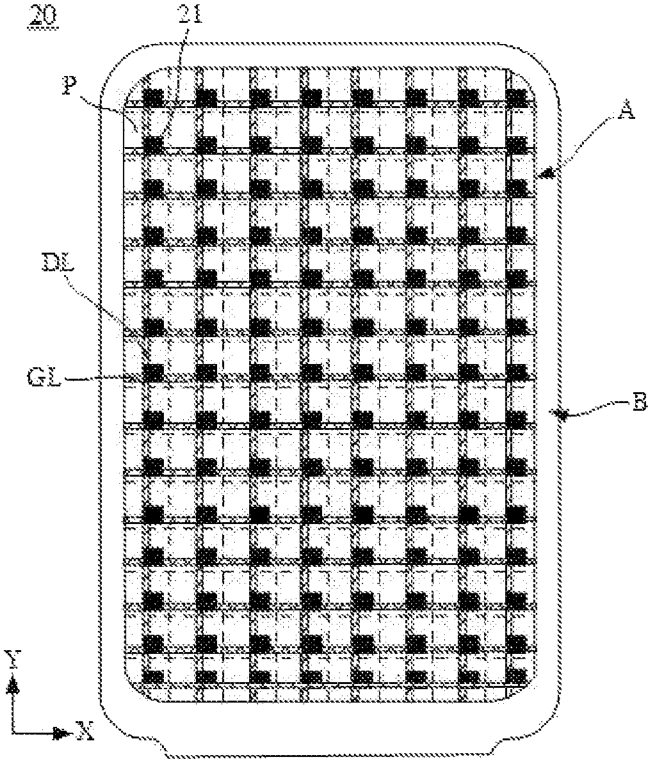
FIG. 2 is a structural diagram of a display apparatus, in accordance with some embodiments.

As shown in FIG. 2, the display apparatus 20 has a display region A and a peripheral region B disposed on at least one side of the display region A. The display region A is a region where images are displayed, and the display region A is configured to be provided therein with sub-pixels P. The peripheral region B is a region where no image is displayed, and the peripheral region B is configured to be provided therein with display driving circuits, such as, a gate driving circuit and a source driving circuit.

A plurality of sub-pixels P are arranged in multiple rows and multiple columns.

Each row includes multiple sub-pixels P arranged along a first direction X, and each column includes multiple sub-pixels P arranged along a second direction Y. Each row of sub-pixels P may include multiple sub-pixels P, and each column of sub-pixels P may include multiple sub-pixels P.

The first direction X and the second direction Y intersect. An included angle between the first direction X and the second direction Y may be set according to actual needs. For example, the included angle between the first direction X and the second direction Y may be 85°, 89° or 90°.

In some embodiments, as shown in FIG. 2, the display apparatus 20 may further include a plurality of gate lines GL and a plurality of data lines DL that are located in the display region A. The plurality of gate lines GL extend along the first direction X, and the plurality of data lines DL extend along the second direction Y.

For example, sub-pixels P arranged in a line along the first direction X are referred to as sub-pixels P in the same row, and sub-pixels P arranged in a line along the second direction Y are referred to as sub-pixels P in the same column. For example, the sub-pixels P in the same row may be coupled to the same gate line GL, and the sub-pixels P in the same column may be coupled to the same data line DL.

Each sub-pixel P includes a pixel driving circuit 21 and a light-emitting element coupled to the pixel driving circuit 21. For example, a single gate line GL may be coupled to pixel driving circuits 21 in sub-pixels P in the same row, and a single data line DL may be coupled to pixel driving circuits 21 in sub-pixels P in the same column.

Figure 3:
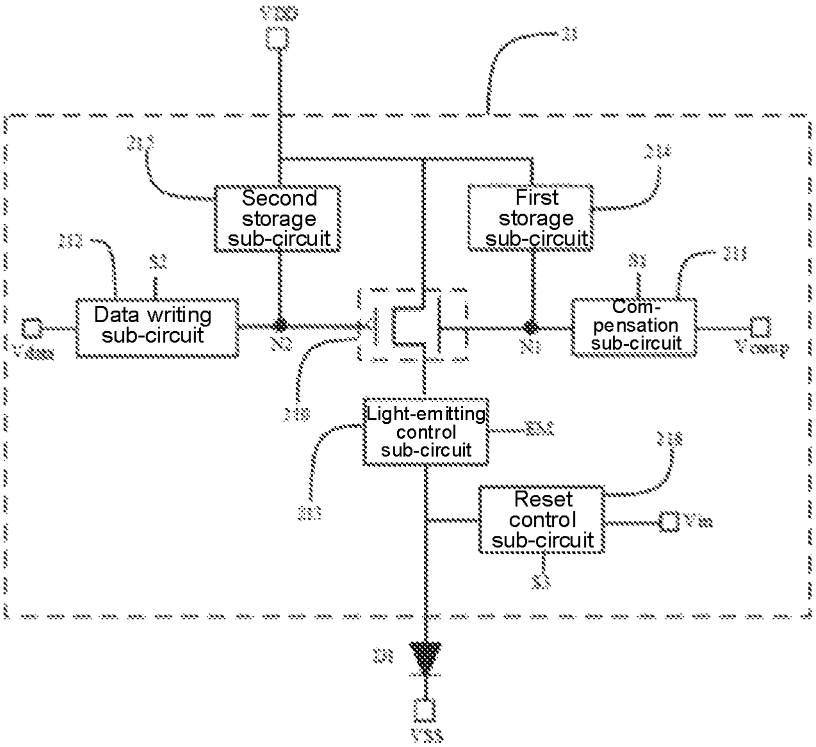
FIG. 3 is a circuit diagram of a pixel driving circuit, in accordance with some embodiments.

The pixel driving circuit 21 of each sub-pixel P may receive GOA driving signals (for example, as shown in FIG. 3, a signal of a first control signal terminal S1, a signal of a second control signal terminal S2, a signal of a third control signal terminal S3, and a signal of a light-emitting control signal terminal EM) through a gate line GL, and receive a voltage signal of a data voltage terminal (which may be referred to a data signal of a data signal terminal below) through a data line DL. Therefore, under control of the GOA driving signals, the pixel driving circuit 21 drives the corresponding light-emitting element to emit light according to the voltage signal of the data voltage terminal.

Some embodiments of the present disclosure provide a pixel driving circuit 21. As shown in FIG. 3, the pixel driving circuit 21 includes a dual-gate driving transistor 210, a compensation sub-circuit 211, a data writing sub-circuit 212, and a light-emitting control sub-circuit 213.

The dual-gate driving transistor 210 includes a first gate, a second gate, a first electrode and a second electrode. The first gate of the dual-gate driving transistor 210 is coupled to a first node N1, and the second gate of the dual-gate driving transistor 210 is coupled to a second node N2, and the first electrode of the dual-gate driving transistor 210 is coupled to a first voltage terminal VDD.

Figure 4:
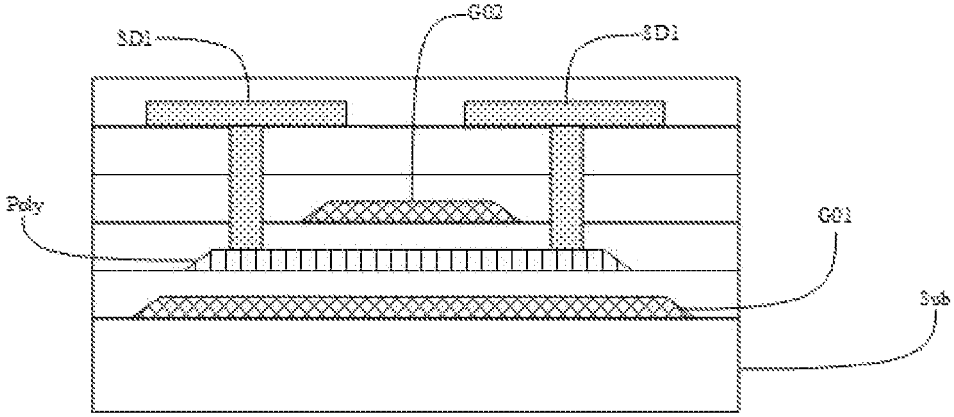
FIG. 4 is a sectional view of a dual-gate driving transistor, in accordance with some embodiments.

In some embodiments, the dual-gate driving transistor 210 may be a driving thin film transistor (DTFT) including two gates. FIG. 4 shows a sectional view of a dual-gate driving transistor 210, the dual-gate driving transistor 210 includes two gates, which are respectively a bottom gate G01 disposed between a substrate Sub and a polysilicon layer Poly and a top gate G02 disposed between the polysilicon layer Poly and a source-drain electrode SD1.

In conjunction with FIG. 3, as shown in FIG. 4, the first gate of the dual-gate driving transistor 210 may be the bottom gate G01 that is disposed between the substrate Sub and the polysilicon layer Poly, and the second gate of the dual-gate driving transistor 210 may be the top gate G02 that is disposed between the polysilicon layer Poly and the source-drain electrode SD1. Of course, the first gate of the dual-gate driving transistor 210 may be the top gate G02 that is disposed between the polysilicon layer Poly and the source-drain electrode SD1, and in this case, the second gate of the dual-gate driving transistor 210 is the bottom gate G01 that is disposed between the substrate Sub and the polysilicon layer Poly, which will not be specifically limited in the embodiments of the present disclosure.

For example, in conjunction with FIG. 3, as shown in FIG. 4, the first electrode of the dual-gate driving transistor 210 may be one of two source-drain electrodes SD1, and the second electrode of the dual-gate driving transistor 210 may be another of the two source-drain electrodes SD1, which is not specifically limited in the embodiments of the present disclosure.

In some embodiments, the first electrode of the dual-gate driving transistor 210 may be a source, and the second electrode of the dual-gate driving transistor 210 may be a drain.

As shown in FIG. 3, the compensation sub-circuit 211 is coupled to a compensation signal terminal Vcomp and the first gate of the dual-gate driving transistor 210, and is configured to write a compensation signal vcomp of the compensation signal terminal Vcomp into the first gate of the dual-gate driving transistor in response to the signal of the first control signal terminal S1.

In some embodiments, as shown in FIG. 3, the pixel driving circuit 21 further includes a first storage sub-circuit 214. The first storage sub-circuit 214 is coupled between the first voltage terminal VDD and the first gate of the dual-gate driving transistor, and is configured to store the compensation signal vcomp.

Figure 5:
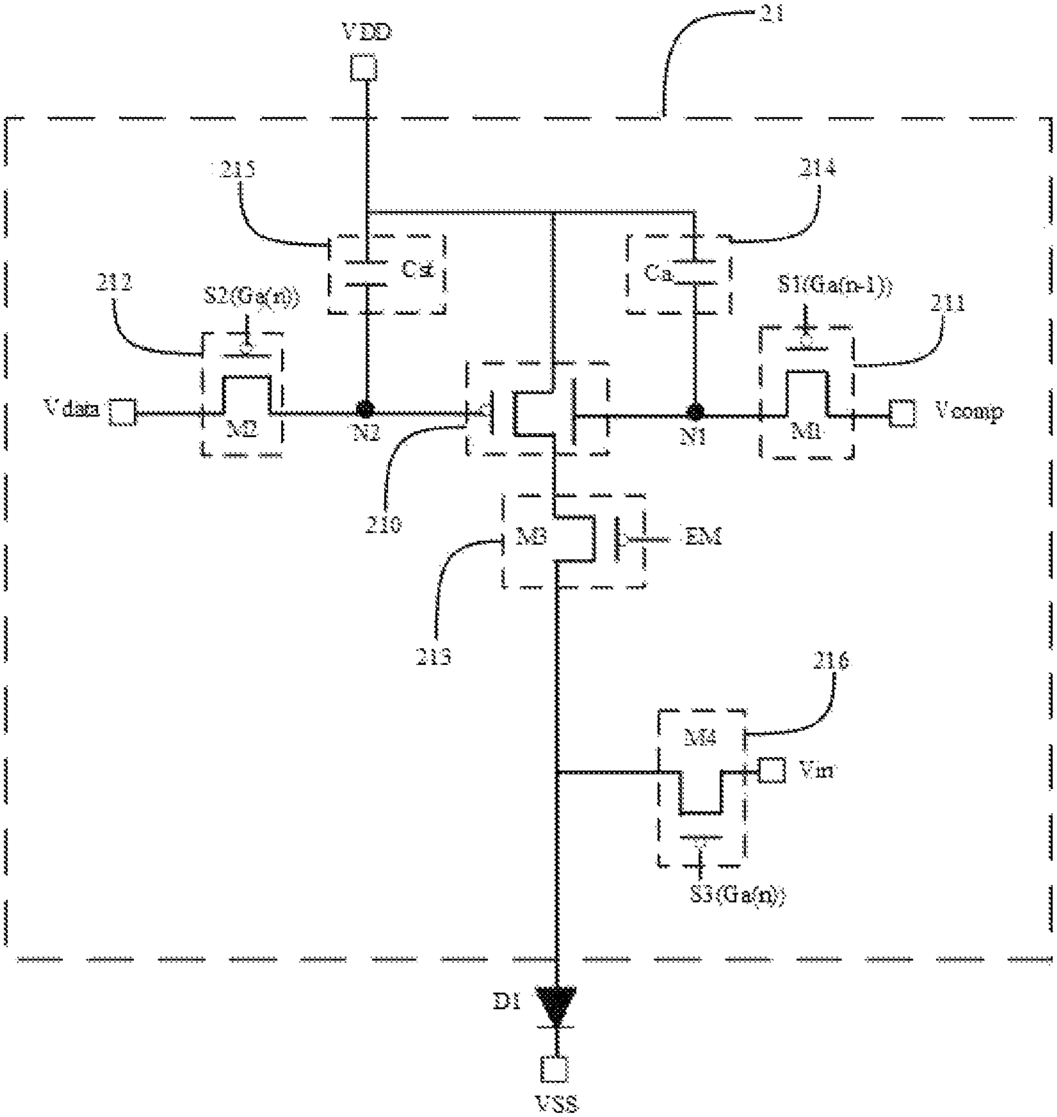
FIG. 5 is a circuit diagram of another pixel driving circuit, in accordance with some embodiments.

In some embodiments, as shown in FIG. 5, the compensation sub-circuit 211 includes a first transistor M1, and the first storage sub-circuit 214 includes a first capacitor Ca. A gate of the first transistor M1 is configured to be coupled to the first control signal terminal S1, a first electrode of the first transistor M1 is coupled to the first gate of the dual-gate driving transistor and a first terminal of the first capacitor Ca, and a second electrode of the first transistor M1 is coupled to the compensation signal terminal Vcomp. A second terminal of the first capacitor Ca is coupled to the first voltage terminal VDD. For example, the first transistor M1 is turned on or off in response to the signal from the first control signal terminal S1. When the first transistor M1 is turned off, the compensation signal terminal Vcomp and the first gate of the dual-gate driving transistor 210 are disconnected, and the compensation signal vcomp cannot be written into the first gate of the dual-gate driving transistor 210. When the first transistor M1 is turned on, the compensation signal terminal Vcomp and the first gate of the dual-gate driving transistor 210 are connected, and the compensation signal vcomp can be written into the first gate of the dual-gate driving transistor 210. At the same time, the compensation signal vcomp is stored in the first capacitor Ca. At this time, a voltage of the first node N1 is vcomp.

In some embodiments, the compensation signal vcomp is the same as a threshold voltage Vth of the dual-gate driving transistor 210. When the display panel is working, due to long-term pressure and high temperature, the threshold voltage Vth of the dual-gate driving transistor 210 will drift. Since the displayed images are different, in the pixel driving circuits of all sub-pixels of the display panel, drift amounts of the threshold voltages Vth of the dual-gate driving transistors 210 are different, which will lead to difference in the display brightness of all sub-pixels, often appearing as an image sticking phenomenon, commonly known as an afterimage. In order to solve the problem of the afterimage caused by different threshold voltages Vth of the dual-gate driving transistors 210, the threshold voltages Vth can be compensated through the compensation signals vcomp of the compensation signal terminals Vcomp.

For example, the threshold voltage Vth of the dual-gate driving transistor 210 in the pixel driving circuit of each sub-pixel is firstly obtained, and then the voltage of the compensation signal vcomp is set to the threshold voltage Vth of the dual-gate driving transistor DTFT. When the compensation signal vcomp is written into the first gate of the dual-gate driving transistor DTFT, the voltage of the first node N1 at this time is vcomp, so that the threshold voltage Vth of the dual-gate driving transistor DTFT can be compensated to avoid the afterimage.

As shown in FIG. 3, the data writing sub-circuit 212 is coupled to a data signal terminal Vdata and the second gate of the dual-gate driving transistor 210, and is configured to write a data signal vdata of the data signal terminal Vdata into the second gate of the dual-gate driving transistor 210 in response to the signal of the second control signal terminal S2.

In some embodiments, as shown in FIG. 3, the pixel driving circuit 21 further includes a second storage sub-circuit 215. The second storage sub-circuit 215 is coupled to the first voltage terminal VDD and the second gate of the dual-gate driving transistor 210, and is configured to store the data signal vdata.

In some embodiments, as shown in FIG. 5, the data writing circuit 212 includes a second transistor M2, and the second storage sub-circuit includes a second capacitor Cst. A gate of the second transistor M2 is configured to be coupled to the second control signal terminal S2, a first electrode of the second transistor M2 is coupled to the data signal terminal Vdata, and a second electrode of the second transistor M2 is coupled to a first terminal of the second capacitor Cst and the second gate of the dual-gate driving transistor 210. A second terminal of the second capacitor Cst is coupled to the first voltage terminal VDD.

For example, the second transistor M2 is turned on or off in response to the signal of the second control signal terminal S2. When the second transistor M2 is turned off, the data signal terminal Vdata and the second gate of the dual-gate driving transistor 210 are disconnected, and the data signal vdata cannot be written into the second gate of the dual-gate driving transistor 210. When the second transistor M2 is turned on, the data signal terminal Vdata and the second gate of the dual-gate driving transistor 210 are connected, and the data signal vdata can be written into the second gate of the dual-gate driving transistor 210. At the same time, the data signal vdata is stored in the second capacitor Cst. At this time, a voltage of the second node N2 is vdata.

As shown in FIG. 3, the light-emitting control sub-circuit 213 is coupled to the second electrode of the dual-gate driving transistor 210 and a first electrode of the light-emitting element D1, and is configured to cause the second electrode of the double-gate driving transistor 210 and the first electrode of the light-emitting element D1 to be connected or disconnected in response to the signal of the light-emitting control signal terminal EM. In some embodiments, as shown in FIG. 5, the light-emitting control sub-circuit 213 includes a third transistor M3, a gate of the third transistor M3 is configured to be coupled to the light-emitting control signal terminal EM, a first electrode of the third transistor M3 is coupled to the second electrode of the dual-gate driving transistor 210, and a second electrode of the third transistor M3 is coupled to the first electrode of the light-emitting element D1. A second electrode of the light-emitting element is coupled to a third voltage terminal VSS.

For example, the third transistor M3 may be turned on or off in response to the signal of the third control signal terminal S3. When the third transistor M3 is turned off, the second electrode of the dual-gate driving transistor 210 and the first electrode of the light-emitting element D1 are disconnected, and an output current of the dual-gate driving transistor 210 cannot flow into the light-emitting element D1 from the second electrode of the dual-gate driving transistor 210, so that the light-emitting element D1 will maintain the current display state. When the third transistor M3 is turned on, the second electrode of the dual-gate driving transistor 210 and the first electrode of the light-emitting element D1 are connected, and the output current of the dual-gate driving transistor 210 can flow into the light-emitting element D1 from the second electrode of the dual-gate driving transistor 210, so that the light-emitting element D1 is driven to emit light.

In some embodiments, as shown in FIG. 3, the pixel driving circuit 21 further includes a reset control sub-circuit 216. The reset control sub-circuit 216 is coupled to the first electrode of the light-emitting element D1 and a second voltage terminal, and is configured to write a voltage signal vin of the second voltage terminal Vin into the first electrode of the light-emitting element D1 in response to the signal of the third control signal terminal S3, so as to reset the first electrode of the light-emitting element D1.

In some embodiments, as shown in FIG. 5, the reset control sub-circuit 216 includes a fourth transistor M4, a gate of the fourth transistor M4 is configured to be coupled to the third control signal terminal S3, a first electrode of the fourth transistor M4 is coupled to the first electrode of the light-emitting element D1, and a second electrode of the fourth transistor M4 is coupled to the second voltage terminal Vin.

It can be understood that the first electrode of the light-emitting element D1 may be reset before the second electrode of the dual-gate driving transistor DTFT is connected to the first electrode of the light-emitting element D1. In addition, an anode of the light-emitting element D1 may be reset at the same time as the compensation data is written into the first gate of the dual-gate driving transistor DTFT. Alternatively, the anode of the light-emitting element D1 may be reset at the same time as the data signal vdata is written into the second gate of the dual-gate driving transistor DTFT. That is to say, the fourth transistor M4 may be controlled to be turned on at the same time as the first transistor M1 is controlled to be turned on, or the fourth transistor M4 may be controlled to be turned on at the same time as the second transistor M2 is controlled to be turned on. Therefore, the third control signal terminal S3 and the first control signal terminal S1 may be connected to the same signal line, or the third control signal terminal S3 and the second control signal terminal S2 may be connected to the same signal line.

Figure 6:
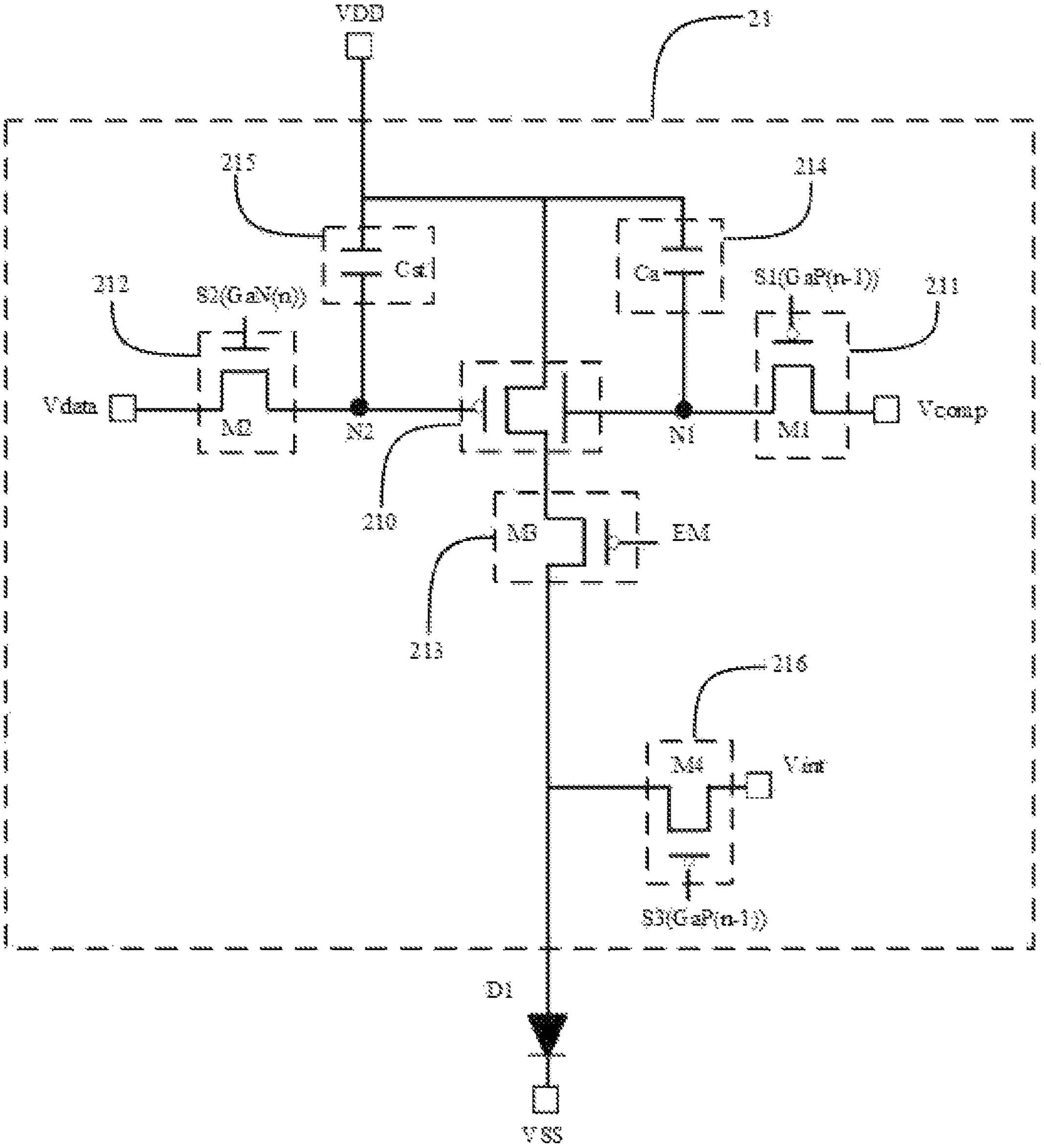
FIG. 6 is a structural diagram of a pixel driving circuit, in accordance with some embodiments.

In some embodiments, as shown in FIG. 5, when the second transistor M2 is a P-type transistor, the second control signal terminal S2 and the third control signal terminal S3 are connected to the same signal line Ga (n). In some embodiments, as shown in FIG. 6, when the second transistor M2 is an N-type transistor, the first control signal terminal S1 and the third control signal terminal S3 are connected to the same signal line GaP (n−1).

In the embodiments provided by the present disclosure, the pixel driving circuit 21 includes three groups of GOA driving signals, and the three groups of GOA driving signals are respectively Ga (n), Ga (n−1) and EM, or the three groups of GOA driving signals are respectively GaN (n), GaP (n−1) and EM. Due to the three groups of GOA driving signals, not only can the compensation signal vcomp be written into the first gate of the dual-gate driving transistor 210, the data signal vdata be written into the second gate of the dual-gate driving transistor 210, and the dual-gate driving transistor 210 and the first electrode of the light-emitting element D1 be controlled to be connected or disconnected, but the first electrode of the light-emitting element D1 can also be reset. Obviously, since the pixel driving circuit 21 provided in the embodiments of the present disclosure requires fewer groups of GOA driving signals, compared with the pixel driving circuit of the 7T1C structure, it is possible to reduce the number of groups of GOA driving signals and simplify the layout. Moreover, the pixel driving circuit 21 provided in the embodiments of the present disclosure includes a smaller number of devices and therefore is more suitable for high PPI products.

In addition, the voltage of the second gate of the dual-gate driving transistor 210 is the data signal vdata. Since the potential of the data signal vdata is high, the potential of the second capacitor Cst coupled to the second gate of the dual-gate driving transistor 210 is high. Compared with the pixel driving circuit shown in FIG. 1 in which the potential of the capacitor C1 is high and the potential of the reset signal vinit1 is low, in the embodiments of the present disclosure, the current between the second capacitor Cst and the data signal terminal Vdata is less than the current between the capacitor C1 and the reset signal terminal Vinit1; therefore, it may be possible to reduce the leakage current due to high-low potential, and reduce the influence of the leakage current on the potential of the second gate of the dual-gate driving transistor 210.

In addition, the second gate of the dual-gate driving transistor 210 is connected to only one transistor, that is, the second transistor M2. Compared with the pixel driving circuit shown in FIG. 1 in which the gate of the driving transistor T4 is connected to both the transistor T1 and the transistor T2, the embodiments provided by the present disclosure reduce the number of transistors connected to the second gate of the dual-gate driving transistor 210, that is, decrease leakage paths, can reduce the leakage current, and can reduce the influence of the leakage current on the potential of the second gate of the dual-gate driving transistor 210. In some embodiments, the second transistor M2 may be an oxide transistor, and the oxide transistor can further reduce the leakage current, thus further reducing the influence of the leakage current on the potential of the second gate of the dual-gate driving transistor 210. Therefore, the pixel driving circuit 21 provided in the embodiments of the present disclosure can ameliorate the flicker phenomenon of the light-emitting element D1 and solve the problem of uneven brightness (mura) of the display panel.

Figure 7:
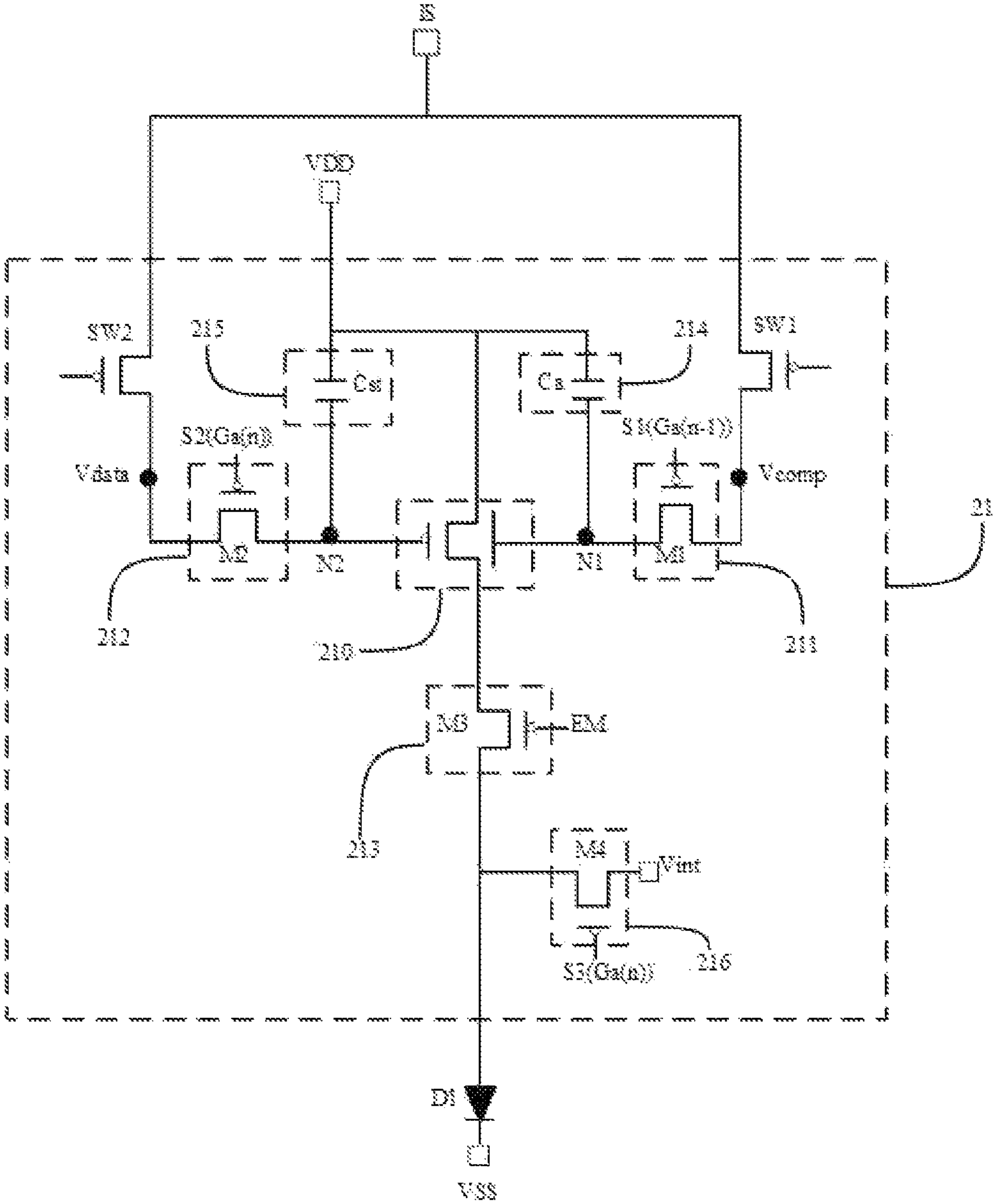
FIG. 7 is a structural diagram of another pixel driving circuit, in accordance with some embodiments.

In some embodiments, as shown in FIG. 7, the pixel driving circuit 21 further includes a first selecting device SW1 and a second selecting device SW2. A first terminal of the first selecting device SW1 and a first terminal of the second selecting device SW2 are coupled to a signal input terminal IS. A second terminal of the first selecting device SW1 is coupled to the compensation signal terminal Vcomp, and a second terminal of the second selecting device SW2 is coupled to the data signal terminal Vdata. The first selecting device SW1 and the second selecting device SW2 are not turned on at the same time.

A signal of the signal input terminal IS can be the compensation signal vcomp or the data signal vdata. Therefore, a signal entering the pixel driving circuit 21 can be selected by controlling the first selecting device SW1 and the second selecting device SW2 to be turned on/off. Since the first selecting device SW1 and the second selecting device SW2 are not turned on at the same time, one signal will not flow into the two gates of the dual-gate driving transistor 210 at the same time, which ensures the normal operation of the pixel driving circuit. The following embodiments will describe how to select a signal entering the pixel driving circuit 21.

When the signal of the signal input terminal IS is the compensation signal vcomp, the first selecting device SW1 is controlled to be turned on, and the second selecting device SW2 is turned off. As shown in FIG. 4, the second terminal of the first selecting device SW1 is coupled to the second electrode of the first transistor M1, and the compensation signal vcomp can arrive at the second electrode of the first transistor M1 from the signal input terminal IS through the first selecting device SW1. In this case, the first transistor M1 is controlled to be turned on. Since the first electrode of the first transistor M1 is coupled to the first gate of the dual-gate driving transistor 210, the compensation signal vcomp can be written into the first gate of the dual-gate driving transistor 210. Since the second selecting device SW2 is turned off at this time, the compensation signal vcomp will not arrive at the data signal terminal Vdata through the second selecting device SW2. Therefore, it can be ensured that the compensation signal vcomp entering the pixel driving circuit 21 will not enter the first gate and the second gate of the dual-gate driving transistor 210 at the same time.

When the signal of the signal input terminal IS is the data signal vdata, the second selecting device SW2 is controlled to be turned on, and the first selecting device SW1 is turned off. As shown in FIG. 4, the second terminal of the second selecting device SW2 is coupled to the first electrode of the second transistor M2, and the data signal vdata can arrive at the first electrode of the second transistor M2 from the signal input terminal IS through the second selecting device SW2. At this time, the second transistor M2 is controlled to be turned on. Since the second electrode of the second transistor M2 is coupled to the second gate of the dual-gate driving transistor 210, the data signal vdata can be written into the second gate of the dual-gate driving transistor 210. Since the first selecting device SW1 is turned off at this time, the data signal vdata will not arrive at the compensation signal terminal Vcomp through the second selecting device SW2. Therefore, it can be ensured that the data signal vdata entering the pixel driving circuit 21 will not enter the first gate and the second gate of the dual-gate driving transistor 210 at the same time.

The first selecting device SW1 and the second selecting device SW2 may be any elements with a switching function. For example, the first selecting device SW1 and the second selecting device SW2 may be transistors. The embodiments of the present disclosure do not specifically limit the types of the first selecting device SW1 and the second selecting device SW2.

In some embodiments, a first electrode is one of a source and a drain of a transistor, and a second electrode is the other of the source and the drain of the transistor. Since the source and the drain of the transistor may be symmetrical in structure, the source and the drain of the transistor may be indistinguishable in structure. That is, there may be no difference in structure between the first electrode and the second electrode of the transistor in the embodiments of the present disclosure. The embodiments of the present disclosure do not limit whether the first transistor M1, the second transistor M2, the third transistor M3, and the fourth transistor M4 are of N-type or P-type.

In some embodiments, the workflow of the pixel driving circuit 21 in a display frame will be illustrated by taking an example in which the first transistor M1, the second transistor M2, the third transistor M3 and the fourth transistor M4 are all P-type transistors.

Figure 8:
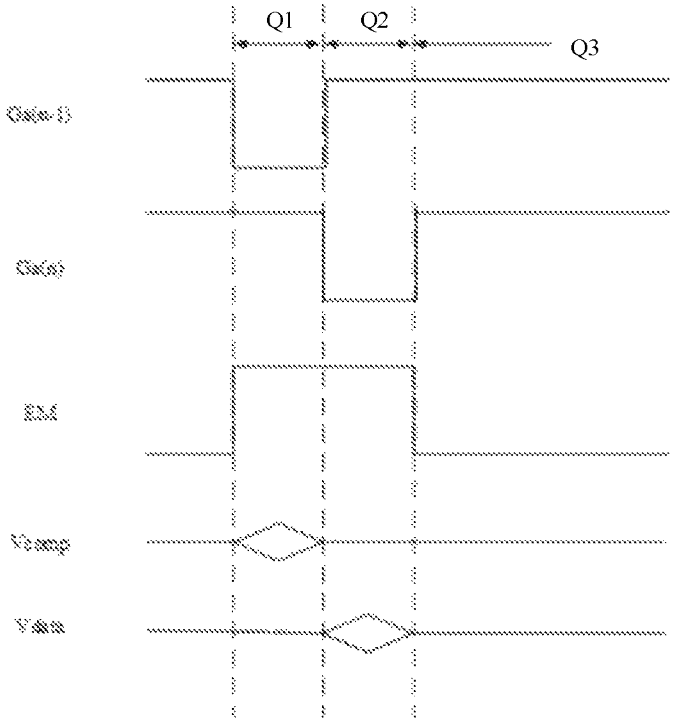
FIG. 8 is a signal timing diagram of a pixel driving circuit, in accordance with some embodiments.

As shown in FIG. 8, the workflow of the pixel driving circuit 21 in a single display frame includes a compensation control phase Q1, a data writing phase Q2, and a light-emitting phase Q3.

In conjunction with FIGS. 5 and 7, as shown in FIG. 8, in the compensation control phase Q1, the signal of the signal input terminal IS is the compensation signal vcomp, the first selecting device SW1 is controlled to be turned on, and the second selecting device SW2 is controlled to be turned off. A signal of the signal line Ga (n−1) of the first control signal terminal S1 is controlled to be at a low level, and the first transistor M1 is turned on. A signal of the signal line Ga (n) of the second control signal terminal S2 and the third control signal terminal S3 is controlled to be at a high level, and the second transistor M2 and the fourth transistor M4 are turned off. A signal of the light-emitting control signal terminal EM is controlled to be at a high level, and the third transistor M3 is turned off.

Since the first selecting device SW1 and the first transistor M1 are turned on, the compensation signal vcomp can arrive at the first gate of the dual-gate driving transistor 210 from the signal input terminal IS through the first selecting device SW1 and the first transistor M1, so that the compensation signal vcomp is written into the first gate of the dual-gate driving transistor 210. At this time, the compensation signal vcomp can be stored in the first capacitor Ca, and the voltage value of the first node N1 is vcomp.

In conjunction with FIGS. 5 and 7, as shown in FIG. 8, in the data writing phase Q2, the signal of the signal input terminal IC is the data signal vdata, the second selecting device SW2 is controlled to be turned on, and the first selecting device SW1 is controlled to be turned off. The signal of the signal line Ga (n−1) of the first control signal terminal S1 is controlled to be at a high level, and the first transistor M1 is turned off. The signal of the light-emitting control signal terminal EM is controlled to be at a high level, and the third transistor M3 is turned off. The signal of the signal line Ga (n) of the second control signal terminal S2 and the third control signal terminal S3 is controlled to be at a low level, and the second transistor M2 and the fourth transistor M4 are turned on.

Since the second selecting device SW2 and the second transistor M2 are turned on, the data signal vdata can be written from the signal input terminal IS into the second gate of the dual-gate driving transistor 210 through the second selecting device SW2 and the second transistor M2. At this time, the data signal vdata can be stored in the second capacitor Cst, and the voltage value of the second node N2 is vdata. Since the fourth transistor M4 is turned on, the voltage signal vin of the second voltage terminal Vin can be written into the first electrode of the light-emitting element D1 through the fourth transistor M4, so as to reset the first electrode of the light-emitting element D1.

In conjunction with FIGS. 5 and 7, as shown in FIG. 8, in the light-emitting phase Q3, the first selecting device SW1 and the second selecting device SW2 are controlled to be turned off, and the signal input terminal IS is disconnected from the first gate or the second gate of the dual-gate driving transistor 210. In this case, the signal of the signal line Ga (n−1) of the first control signal terminal S1 is controlled to be at a high level, and the first transistor M1 is turned off. The signal of the signal line Ga (n) of the second control signal terminal S2 and the third control signal terminal S3 is controlled to be at a high level, and the second transistor M2 and the fourth transistor M4 are turned off. The signal of the light-emitting control signal terminal EM is controlled to be at a low level, and the third transistor M3 is turned on.

Since the third transistor M3 is turned on, the second electrode of the dual-gate driving transistor 210 and the light-emitting element D1 are connected. Therefore, the output current I of the dual-gate driving transistor 210 flows into the light-emitting element D1 from the second electrode of the dual-gate driving transistor 210 to drive the light-emitting element D1 to emit light.

In this case, the voltage of the first electrode of the dual-gate driving transistor 210 is vdd, the voltage of the first gate of the dual-gate driving transistor 210 (that is, the voltage of the first node N1) is vcomp, and the voltage of the second gate of the dual-gate driving transistor 210 (that is, the voltage of the second node N2) is vdata; therefore, the gate-source voltage $V_{gs}$ of the dual-gate driving transistor 210 is $V_{gs}$=vdata+vcomp−vdd. The output current I of the dual-gate driving transistor 210 may be determined by using a formula $I=k\times(V_{gs}-V_{th})^2$, where k is the K value of the dual-gate driving transistor 210, and the K value of the transistor is a structural constant related to the process and design. Since vcomp=vth, the output current I of the dual-gate driving transistor 210 may be determined by using a formula $I=k\times(vdata-vdd)^2$. Therefore, the driving current of the light-emitting element D1 (that is, the output current I of the dual-gate driving transistor 210) is not affected by the threshold voltage Vth of the dual-gate driving transistor 210.

As a result, the mura caused by the uneven threshold voltages Vth of the dual-gate driving transistors 210 may be ameliorated.

In some embodiments, as shown in FIG. 6, when the second transistor M2 is an N-type transistor, and the first transistor M1, the third transistor M3 and the fourth transistor M4 are P-type transistors, the first control signal terminals S1 and the third control signal terminal S3 are connected to the same signal line GaP (n−1), and the second control signal terminal S2 is connected to the signal line GaN (n). The workflow of the pixel driving circuit 21 shown in FIG. 6 in a display frame is similar to the workflow of the pixel driving circuit 21 shown in FIGS. 5 and 7 in a display frame. In conjunction with FIG. 9, the difference between the workflow of the pixel driving circuit 21 shown in FIG. 6 in a display frame and the workflow of the pixel driving circuit 21 shown in FIGS. 5 and 7 in a display frame will be described below.

Figure 9:
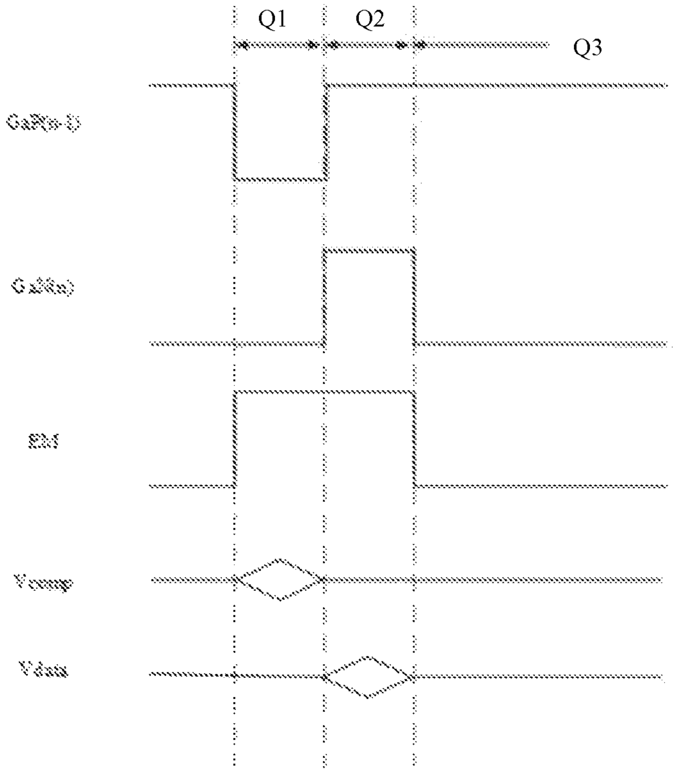
FIG. 9 is a signal timing diagram of another pixel driving circuit, in accordance with some embodiments.

In conjunction with FIG. 6, as shown in FIG. 9, in the compensation control phase Q1, the signal of the signal line GaN (n) of the second control signal terminal S2 is controlled to be at a low level, and the second transistor M2 is turned off. The signal of the signal line GaP (n−1) of the first control signal terminal S1 and the third control signal terminal S3 is controlled to be at a low level, and the first transistor M1 and the fourth transistor M4 are turned on. The first selecting device SW1 is controlled to be turned on, the compensation signal vcomp of the signal input terminal IS can be written into the first gate of the dual-gate driving transistor 210 through the first selecting device SW1 and the first transistor M1. Since the fourth transistor M4 is turned on, the voltage signal vin of the second voltage terminal Vin can be written into the first electrode of the light-emitting element D1 through the fourth transistor M4, so as to reset the first electrode of the light-emitting element D1. It can be understood that the compensation control phase Q1 in the embodiments of the present disclosure can also be called an initialization phase Q1.

In conjunction with FIG. 6, as shown in FIG. 9, in the data writing phase Q2, the signal of the signal line GaN (n) of the second control signal terminal S2 is controlled to be at a high level, and the second transistor M2 is turned on. The signal of the signal line GaP (n−1) of the first control signal terminal S1 and the third control signal terminal S3 is controlled to be at a high level, and the first transistor M1 and the fourth transistor M4 are turned off. The first selecting device SW1 is controlled to be turned on, the data signal vdata of the signal input terminal IS can be written into the second gate of the dual-gate driving transistor 210 through the second selecting device SW2 and the second transistor M2.

It can be understood that, except for the above-mentioned difference between the compensation control phase Q1 and the data writing phase Q2, the workflow of the pixel driving circuit 21 shown in FIG. 6 in a display frame is the same as the workflow of the pixel driving circuit 21 shown in FIGS. 5 and 7 in a display frame, which will not be repeated here. For example, the workflow of the pixel driving circuit 21 shown in FIG. 6 in the light-emitting phase Q3 and the workflow of the pixel driving circuit 21 shown in FIGS. 5 and 7 in the light-emitting phase Q3 are the same, where the first transistor M1, the second transistor M2 and the fourth transistor M4 are controlled to be turned off, and the third transistor M3 is controlled to be turned on, so that the output current I of the dual-gate driving transistor DTFT flows into the light-emitting element D1 from the second electrode of the dual-gate driving transistor DTFT to drive the light-emitting element D1 to emit light.

In yet another aspect, the embodiments of the present disclosure provide a display panel including a plurality of sub-pixels arranged in an array. Each sub-pixel includes a light-emitting element D1 and the pixel driving circuit 21 as described in any one of the above embodiments.

In some embodiments, in conjunction with FIG. 2, as shown in FIG. 5, first control signal terminals S1 of pixel driving circuits of multiple sub-pixels located in an i-th row are connected to a signal line Ga (n−1). In this case, second control signal terminals S2 and third control signal terminals S3 of pixel driving circuits of multiple sub-pixels located in an (i−1)-th row are connected to the signal line Ga (n−1). Therefore, the first control signal terminals S1 of the pixel driving circuits of the multiple sub-pixels located in the i-th row and the second control signal terminals S2 and third control signal terminals S3 of the pixel driving circuits of the multiple sub-pixels located in the (i−1)-th row are connected to the same signal line. Here, i is a positive integer greater than 1, and i is less than or equal to the total number of rows of the plurality of sub-pixels.

Figure 10:
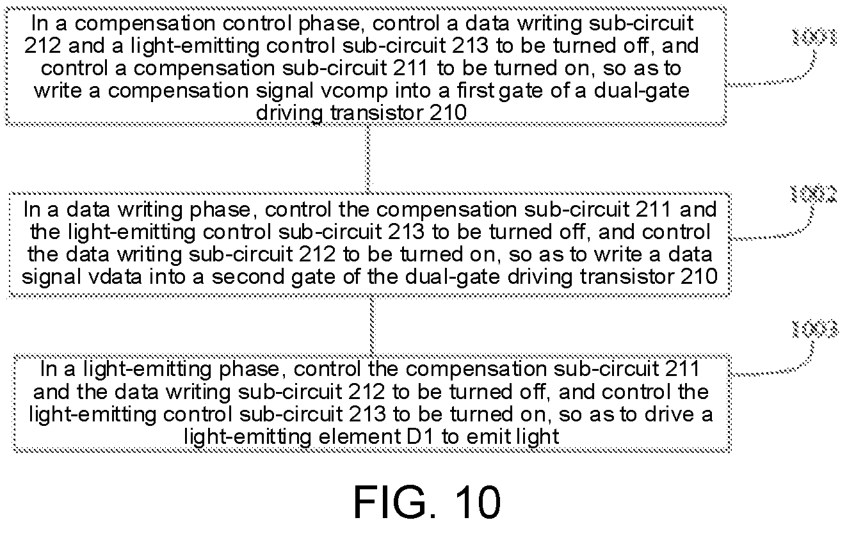
FIG. 10 is a flow diagram of a method of driving a pixel driving circuit, in accordance with some embodiments.

Some embodiments of the present disclosure provide a method of driving a pixel driving circuit, which is used in the pixel driving circuit 21 in any of the above embodiments. The workflow of the pixel driving circuit in a display frame includes a compensation control phase, a data writing phase, and a light-emitting phase. As shown in FIG. 10, the method includes the following steps 1001 to 1003.

In step 1001, in the compensation control phase, the data writing sub-circuit 212 and the light-emitting control sub-circuit 213 are controlled to be turned off, and the compensation sub-circuit 211 is controlled to be turned on, so as to write the compensation signal vcomp into the first gate of the dual-gate driving transistor 210.

In some embodiments, in conjunction with FIGS. 5 and 7, as shown in FIG. 8, in the compensation control phase Q1, that is, in the initialization phase Q1, a signal of the signal line Ga (n−1) is controlled to be at a low level, that is, the signal of the first control signal terminal S1 is at a low level, so that the first transistor M1 is turned on, that is, the compensation sub-circuit 211 is turned on. A signal of the control signal line Ga (n) is controlled to be at a high level, that is, the signal of the second control signal terminal S2 and the signal of the third control signal terminal S3 are at high levels, so that the second transistor M2 and the fourth transistor M4 are turned off, that is, the data writing sub-circuit 212 and the reset control sub-circuit 216 are turned off. The signal of the light-emitting control signal terminal EM is controlled to be at a high level, the third transistor M3 is turned off, that is, the light-emitting control sub-circuit 213 is turned off. Therefore, in the compensation control stage T1, the compensation signal vcomp can be written into the first gate of the dual-gate driving transistor 210 through the first transistor M1, that is, the voltage value of the first node N1 is vcomp.

In some embodiments, in conjunction with FIG. 6, as shown in FIG. 9, in the compensation control phase Q1, a signal of the signal line GaP (n−1) is controlled to be at a low level, that is, the signal of the first control signal terminal S1 and the signal of the third control signal terminal S3 are at low levels, and the first transistor M1 and the fourth transistor M4 are turned on, that is, the compensation sub-circuit 211 and the reset control sub-circuit 216 are turned on. A signal of the signal line GaN (n) is controlled to be at a low level, that is, the signal of the second control signal terminal S2 is at a low level, and the second transistor M2 is turned off, that is, the data writing sub-circuit 212 is turned off. The signal of the light-emitting control signal terminal EM is controlled to be at a high level, the third transistor M3 is turned off, that is, the light-emitting control sub-circuit 213 is turned off. Therefore, in the compensation control phase Q1, the compensation signal vcomp can be written into the first gate of the dual-gate driving transistor 210 through the first transistor M1, that is, through the compensation sub-circuit 211, and the voltage value of the first node N1 is vcomp. At the same time, the voltage signal vin of the second voltage terminal Vin can be written into the first electrode of the light-emitting element D1 through the fourth transistor M4, that is, through the reset control sub-circuit 216, so as to reset the first electrode of the light-emitting element D1.

In step 1002, in the data writing phase, the compensation sub-circuit 211 and the light-emitting control sub-circuit 213 are controlled to be turned off, and the data writing sub-circuit 212 is controlled to be turned on, so as to write the data signal vdata into the second gate of the dual-gate driving transistor 210.

In some embodiments, in conjunction with FIGS. 5 and 7, as shown in FIG. 8, in the data writing phase Q2, the signal of the signal line Ga (n−1) is controlled to be at a high level, that is, the signal of the first control signal terminal S1 is at a high level, and the first transistor M1 is turned off, that is, the compensation sub-circuit 211 is turned off. The signal of the signal line Ga (n) is controlled to be at a low level, that is, the signal of the second control signal terminal S2 and the signal of the third control signal terminal S3 are at low levels, and the second transistor M2 and the fourth transistor M4 are turned on, that is, the data writing sub-circuit 212 and the reset control sub-circuit 216 are turned on. The signal of the light-emitting control signal terminal EM is controlled to be at a high level, the third transistor M3 is turned off, that is, the light-emitting control sub-circuit 213 is turned off. Therefore, in the data writing phase Q2, the data signal vdata can be written into the second gate of the dual-gate driving transistor 210 through the second transistor M2, that is, through the data writing sub-circuit 212, and the voltage value of the second node N2 is vdata. At the same time, the voltage signal vin of the second voltage terminal Vin can be written into the first electrode of the light-emitting element D1 through the fourth transistor M4, that is, through the reset control sub-circuit 216, so as to reset the first electrode of the light-emitting element D1.

In some embodiments, in conjunction with FIG. 6, as shown in FIG. 9, in the data writing phase Q2, the signal of the signal line GaP (n−1) is controlled to be at a high level, that is, the signal of the first control signal terminal S1 and the signal of the third control signal terminal S3 are at high levels, and the first transistor M1 and the fourth transistor M4 are turned off, that is, the compensation sub-circuit 211 and the reset control sub-circuit 216 are turned off. The signal of the signal line GaN (n) is controlled to be at a high level, that is, the signal of the second control signal terminal S2 is at a high level, and the second transistor M2 is turned on, that is, the data writing sub-circuit 212 is turned on. The signal of the light-emitting control signal terminal EM is controlled to be at a high level, and the third transistor M3 is turned off, that is, the light-emitting control sub-circuit 213 is turned off. Therefore, in the data writing phase Q2, the data signal vdata can be written into the second gate of the dual-gate driving transistor 210 through the second transistor M2, that is, through the data writing sub-circuit 212, and the voltage value of the second node N2 is vdata.

In step 1003, in the light-emitting phase, the compensation sub-circuit 211 and the data writing sub-circuit 212 are controlled to be turned off, and the light-emitting control sub-circuit 213 is controlled to be turned on, so as to drive the light-emitting element D1 to emit light.

In some embodiments, in conjunction with FIGS. 5 and 7, as shown in FIG. 8, in the light-emitting phase Q3, the signal of the signal line Ga (n−1) is controlled to be at a high level, that is, the signal of the first control signal terminal S1 is at a high level, and the first transistor M1 is turned off, that is, the compensation sub-circuit 211 is turned off. The signal of the signal line Ga (n) is controlled to be at a high level, that is, the signal of the second control signal terminal S2 and the signal of the third control signal terminal S3 are at high levels, and the second transistor M2 and the fourth transistor M4 are turned off, that is, the data writing sub-circuit 212 and the reset control sub-circuit 216 are turned off. The signal of the light-emitting control signal terminal EM is controlled to be at a low level, the third transistor M3 is turned on, that is, the light-emitting control sub-circuit 213 is turned on. Therefore, in the light-emitting phase Q3, the second electrode of the dual-gate driving transistor 210 is connected to the light-emitting element D1, and the output current I of the dual-gate driving transistor 210 flows into the light-emitting element D1 through the second electrode of the dual-gate driving transistor 210, so as to drive the light-emitting element D1 to emit light.

In some embodiments, in conjunction with FIG. 6, as shown in FIG. 9, in the light-emitting phase Q3, the signal of the signal line GaP (n−1) is controlled to be at a high level, that is, the signal of the first control signal terminal S1 and the signal of the third control signal terminal S3 are at high levels, and the first transistor M1 and the fourth transistor M4 are turned off, that is, the compensation sub-circuit 211 and the reset control sub-circuit 216 are turned off. The signal of the signal line GaN (n) is controlled to be at a low level, that is, the signal of the second control signal terminal S2 is at a low level, and the second transistor M2 is turned off, that is, the data writing sub-circuit 212 is turned off. The signal of the light-emitting control signal terminal EM is controlled to be at a low level, the third transistor M3 is turned on, that is, the light-emitting control sub-circuit 213 is turned on. Therefore, in the light-emitting phase Q3, the second electrode of the dual-gate driving transistor 210 is connected to the light-emitting element D1, and the output current I of the dual-gate driving transistor 210 flows into the light-emitting element D1 through the second electrode of the dual-gate driving transistor 210, so as to drive the light-emitting element D1 to emit light.

In this case, the voltage of the first electrode of the dual-gate driving transistor 210 is vdd, the voltage of the first gate of the dual-gate driving transistor 210 (that is, the voltage of the first node N1) is vcomp, and the voltage of the second gate of the dual-gate driving transistor 210 (that is, the voltage of the second node N2) is vdata; therefore, the gate-source voltage of the dual-gate driving transistor 210 is $V_{gs}$=vdata+vcomp−vdd. The output current I of the dual-gate driving transistor 210 may be determined by using a formula $I=k\times(V_{gs}-V_{th})^2$, where k is the K value of the dual-gate driving transistor 210, and the K value of the transistor is a structural constant related to the process and design. Since vcomp=vth, the output current I of the dual-gate driving transistor 210 may be determined by using a formula $I=k\times(\text{vdata}-\text{vdd})^2$. Therefore, the driving current of the light-emitting element D1 (that is, the output current I of the dual-gate driving transistor 210) is not affected by the threshold voltage Vth of the dual-gate driving transistor 210.

As a result, the mura caused by the uneven threshold voltages Vth of the dual-gate driving transistors 210 may be ameliorated.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel driving circuit, comprising a dual-gate driving transistor, a compensation sub-circuit, a data writing sub-circuit, a light-emitting control sub-circuit and a second storage sub-circuit, wherein the dual-gate driving transistor includes a first gate, a second gate, a first electrode and a second electrode, and the first electrode of the dual-gate driving transistor is coupled to a first voltage terminal;

the compensation sub-circuit is coupled to a compensation signal terminal and the first gate of the dual-gate driving transistor, and is configured to write a compensation signal of the compensation signal terminal into the first gate of the dual-gate driving transistor in response to a signal of a first control signal terminal;

the data writing sub-circuit is coupled to a data signal terminal and the second gate of the dual-gate driving transistor, and is configured to write a data signal of the data signal terminal into the second gate of the dual-gate driving transistor in response to a signal of a second control signal terminal;

the light-emitting control sub-circuit is coupled to the second electrode of the dual-gate driving transistor and a first electrode of a light-emitting element, and is configured to cause the second electrode of the dual-gate driving transistor and the first electrode of the light-emitting element to be connected or disconnected in response to a signal of the light-emitting control signal terminal; and the second storage sub-circuit is coupled to the first voltage terminal, the second gate of the dual-gate driving transistor and the data writing sub-circuit, and is configured to store the data signal;

wherein the compensation signal is the same as a threshold voltage of the dual-gate driving transistor; and the data writing sub-circuit includes a second transistor; the second storage sub-circuit includes a second capacitor; a gate of the second transistor is configured to be coupled to the second control signal terminal, a first electrode of the second transistor is coupled to the data signal terminal, and a second electrode of the second transistor is coupled to a first terminal of the second capacitor and the second gate of the dual-gate driving transistor; and a second terminal of the second capacitor is coupled to the first voltage terminal.

2. The pixel driving circuit according to claim 1, further comprising a first storage sub-circuit coupled between the first voltage terminal and the first gate of the dual-gate driving transistor and configured to store the compensation signal.

3. The pixel driving circuit according to claim 2, wherein the compensation sub-circuit includes a first transistor; the first storage sub-circuit includes a first capacitor; a gate of the first transistor is configured to be coupled to the first control signal terminal, a first electrode of the first transistor is coupled to the first gate of the dual-gate driving transistor and a first terminal of the first capacitor, and a second electrode of the first transistor is coupled to the compensation signal terminal; and a second terminal of the first capacitor is coupled to the first voltage terminal.

4. The pixel driving circuit according to claim 1, wherein the light-emitting control sub-circuit includes a third transistor, a gate of the third transistor is configured to be coupled to the light-emitting control signal terminal, a first electrode of the third transistor is coupled to the second electrode of the dual-gate driving transistor, and a second electrode of the third transistor is coupled to the first electrode of the light-emitting element.

5. The pixel driving circuit according to claim 1, further comprising a reset control sub-circuit coupled to the first electrode of the light-emitting element and a second voltage terminal and configured to write a signal of the second voltage terminal into the first electrode of the light-emitting element in response to a signal of a third control signal terminal, so as to reset the first electrode of the light-emitting element.

6. The pixel driving circuit according to claim 5, wherein the reset control sub-circuit includes a fourth transistor, a gate of the fourth transistor is configured to be coupled to the third control signal terminal, a first electrode of the fourth transistor is coupled to the first electrode of the light emitting element, and a second electrode of the fourth transistor is coupled to the second voltage terminal.

7. The pixel driving circuit according to claim 6, wherein the second transistor is a P-type transistor, and the second control signal terminal and the third control signal terminal are connected to the same signal line.

8. The pixel driving circuit according to claim 6, wherein the second transistor is an N-type transistor, and the first control signal terminal and the third control signal terminal are connected to the same signal line.

9. The pixel driving circuit according to claim 6, further comprising a first selecting device and a second selecting device, wherein a first terminal of the first selecting device and a first terminal of the second selecting device are coupled to a signal input terminal, a second terminal of the first selecting device is coupled to the compensation signal terminal, a second terminal of the second selecting device is coupled to the data signal terminal, and the first selecting device and the second selecting device are not turned on at the same time.

10. A display panel, comprising a plurality of sub-pixels arranged in an array, wherein each sub-pixel includes the light-emitting element and the pixel driving circuit according to claim 1.

11. A method of driving a pixel driving circuit, used in the pixel driving circuit according to claim 1, wherein a workflow of the pixel driving circuit in a display frame includes a compensation control phase, a data writing phase and a light-emitting phase; the method comprising:

in the compensation control phase, controlling the data writing sub-circuit and the light-emitting control sub-circuit to be turned off, and controlling the compensation sub-circuit to be turned on, so as to write the compensation signal into the first gate of the dual-gate driving transistor;

in the data writing phase, controlling the compensation sub-circuit and the light-emitting control sub-circuit to be turned off, and controlling the data writing sub-circuit to be turned on, so as to write the data signal into the second gate of the dual-gate driving transistor and store the data signal by the second storage sub-circuit; and in the light-emitting phase, controlling the compensation sub-circuit and the data writing sub-circuit to be turned off, and controlling the light-emitting control sub-circuit to be turned on, so as to drive the light-emitting element to emit light.

12. The method according to claim 11, wherein the pixel driving circuit further includes a first selecting device and a second selecting device; the method further comprising:

in the compensation control phase, controlling the first selecting device to be turned on and controlling the second selecting device to be turned off; and in the data writing phase, controlling the second selecting device to be turned on and controlling the first selecting device to be turned off.

13. The display panel according to claim 10, wherein first control signal terminals of pixel driving circuits of sub-pixels located in an i-th row and second control signal terminals and third control signal terminals of pixel driving circuits of sub-pixels located in an (i−1)-th row are connected to the same signal line, where i is a positive integer greater than 1 and i is less than or equal to a total number of rows of the plurality of sub-pixels.

14. The pixel driving circuit according to claim 4, further comprising a reset control sub-circuit coupled to the first electrode of the light-emitting element and a second voltage terminal and configured to write a signal of the second voltage terminal into the first electrode of the light-emitting element in response to a signal of a third control signal terminal, so as to reset the first electrode of the light-emitting element.

15. The pixel driving circuit according to claim 14, wherein the reset control sub-circuit includes a fourth transistor, a gate of the fourth transistor is configured to be coupled to the third control signal terminal, a first electrode of the fourth transistor is coupled to the first electrode of the light emitting element, and a second electrode of the fourth transistor is coupled to the second voltage terminal.

16. The pixel driving circuit according to claim 15, further comprising a first selecting device and a second selecting device, wherein a first terminal of the first selecting device and a first terminal of the second selecting device are coupled to a signal input terminal, a second terminal of the first selecting device is coupled to the compensation signal terminal, a second terminal of the second selecting device is coupled to the data signal terminal, and the first selecting device and the second selecting device are not turned on at the same time.

* * * * *